US012711635B2

(12) United States Patent
Guo et al.

(10) Patent No.: US 12,711,635 B2
(45) Date of Patent: Aug. 18, 2026

(54) METHOD, DEVICE, AND STORAGE MEDIUM FOR IMPROVING MULTI-OBJECT TRACKING

(71) Applicant: Fujitsu Limited, Kawasaki (JP)

(72) Inventors: Song Guo, Beijing (CN); Rujie Liu, Beijing (CN)

(73) Assignee: Fujitsu Limited, Kawasaki (JP)

( * ) Notice: Subject to any disclaimer, the term of this patent is extended or adjusted under 35 U.S.C. 154(b) by 336 days.

(21) Appl. No.: 18/613,206

(22) Filed: Mar. 22, 2024

(65) Prior Publication Data

US 2024/0346663 A1 Oct. 17, 2024

(30) Foreign Application Priority Data

Apr. 17, 2023 (CN) ......................... 202310405367.0

(51) Int. Cl.
*G06T 7/20* (2017.01)
*G06V 10/44* (2022.01)
(Continued)

(52) U.S. Cl.
CPC ................ *G06T 7/20* (2013.01); *G06V 10/44* (2022.01); *G06V 10/762* (2022.01); *G06V 20/70* (2022.01); *G06V 2201/07* (2022.01)

(58) Field of Classification Search
CPC ............. G06T 7/20; G06T 2207/20021; G06T 2207/30241; G06T 7/292; G06T 7/74; G06T 7/246; G06T 2207/10016; G06V 10/44; G06V 10/762; G06V 20/70; G06V 2201/07; G06V 10/62; G06V 10/40; G06V 20/40; G06V 20/46; G06F 18/23
(Continued)

(56) References Cited

U.S. PATENT DOCUMENTS

2023/0316715 A1* 10/2023 Kumar et al. ....... G06V 10/764
2025/0308265 A1* 10/2025 Zhou et al. .......... G06V 20/695

OTHER PUBLICATIONS

An article entitled "Hierarchical Clustering: Explanation and Classification", by Clara Diaz-Pines, published online on http://quantdare.com/author/cdiaz/ on May 25, 2022 (Year: 2022).*
(Continued)

*Primary Examiner* — Matthew C Bella
*Assistant Examiner* — Daniel Joseph Santos
(74) *Attorney, Agent, or Firm* — XSENSUS LLP

(57) ABSTRACT

The present disclosure relates to a method, device and storage medium for improving multi-object tracking. According to an embodiment, the method comprises: performing a split operation on a tracklet provided for one object by a multi-object tracking model. The split operation comprises: determining an appearance feature sequence of the tracklet; determining a clustering label set of the appearance feature sequence; determining an image block label sequence; determining a fragment label sequence corresponding to continuous fragments, having the same clustering labels, in the image block label sequence; in a case where a length of the fragment label sequence is greater than the number of types of the clustering labels in the clustering label set, updating the image block label sequence and the fragment label sequence by performing an update operation; and splitting the tracklet based on the updated image block label sequence. The method may further comprise a merge operation.

20 Claims, 5 Drawing Sheets

(51) Int. Cl.
*G06V 10/762* (2022.01)
*G06V 20/70* (2022.01)

(58) Field of Classification Search
USPC .......................................................... 382/103
See application file for complete search history.

(56) References Cited

OTHER PUBLICATIONS

An article entitled "Multi-Object Tracking Using Multi-Channel Part Appearance Representation", by Ahn et al., published Aug. 1, 2017 in 2017 14th IEEE International Conference on Advanced Video and Signal Based Surveillance (AVSS) (2017, pp. 1-6) (Year: 2017).*

An article entitled "Tracklet-refined Multi-Camera Tracking Based on Balanced Cross-Domain Re-Identification for Vehicles", by Yang et al., published Jun. 1, 2021 in 2021 IEEE/CVF Conference on Computer Vision and Pattern Recognition Workshops (CVPRW) (2021, pp. 3978-3987) (Year: 2021).*

An article entitled "ReMOT: A model-agnostic refinement for multiple object tracking", by Yang et al., published in Feb. 2021 in Image and Vision Computing 106 (2021) 104091 (Year: 2021).*

* cited by examiner

METHOD, DEVICE, AND STORAGE MEDIUM FOR IMPROVING MULTI-OBJECT TRACKING

CROSS-REFERENCE TO RELATED APPLICATION

This application claims the priority benefit of Chinese Patent Application No. 202310405367.0, filed on Apr. 17, 2023 in the China National Intellectual Property Administration, the disclosure of which is incorporated herein in its entirety by reference.

FIELD OF THE INVENTION

The present disclosure relates generally to information processing and computer vision, and more particularly, to a method, a device and a storage medium for improving multi-object tracking.

BACKGROUND OF THE INVENTION

With the development of computer science and artificial intelligence, it is becoming increasingly universal and effective to use computers to run artificial intelligence models based on neural networks to implement information processing. Computer vision is an important application field of artificial intelligence models.

A hotspot of computer vision technology is multi-object tracking. Multi-object tracking is commonly referred to as MTT (Multiple Target Tracking; sometimes also abbreviated as MOT: Multiple Object Tracking) briefly, which is used to detect and endow identifications (IDs) to objects of multiple types of interest such as pedestrians, automobiles or/or animals in a video, so as to perform trajectory tracking, without knowing the number of the objects in advance. A desired tracking result is that: for captured video segments, after multi-object tracking is performed, different objects are endowed with different IDs, so as to achieve work such as accurate tracking, accurate searching and the like. MOT is a key technology in the field of computer vision, and has been widely applied in fields such as autonomous driving, intelligent monitoring, behavior recognition and the like.

In multi-object tracking, for an input video, a tracking result of objects is output. In a tracking result image, each object is indicated by, for example, a rectangular bounding box with a corresponding ID identification number. In an image sequence of multiple frames of a video, a moving trajectory of a bounding box of the same ID can be regarded as a trajectory of an object of the ID. In these multiple frames, an image block sequence of multiple image blocks indicated by the bounding box of the ID is referred to as a tracklet (tracklet). In one tracklet, each image block therein can be regarded as a frame of image of the tracklet.

The adverse factors affecting the accuracy of a result of multi-object tracking include: occlusion, illumination, attitude changes, etc. It is challenging to improve the accuracy of multi-object tracking.

SUMMARY OF THE INVENTION

A brief summary of the present disclosure will be given below to provide a basic understanding of some aspects of the present disclosure. It should be understood that the summary is not an exhaustive summary of the present disclosure. It does not intend to define a key or important part of the present disclosure, nor does it intend to limit the scope of the present disclosure. The object of the summary is only to briefly present some concepts, which serves as a preamble of the detailed description that follows.

Existing multi-object tracking models may output imperfect tracklets. This is mainly reflected as two deficiencies: (1) one tracklet contains multiple different objects; (2) one object is in multiple different tracklets. The technical problems to be solved by the present disclosure include but are not limited to reducing at least one of the above-mentioned deficiencies, so as to improve the accuracy of multi-object tracking According to an aspect of the present disclosure, there is provided a computer-implemented method for improving multi-object tracking. The method comprises: performing a split operation on each of a plurality of tracklets, for corresponding objects respectively, provided by a multi-object tracking model; wherein the split operation comprises: determining an appearance feature sequence corresponding to an image block sequence of the tracklet; determining a clustering label set by clustering a plurality of appearance features in the appearance feature sequence; determining, based on the clustering label set, an image block label sequence composed of clustering labels of appearance features of image blocks in the image block sequence; determining a fragment label sequence corresponding to continuous fragments, having the same clustering labels, in the image block label sequence, wherein each of fragment labels in the fragment label sequence is the same clustering label of a corresponding continuous fragment; in a case where a length of the fragment label sequence is greater than the number of types of the clustering labels in the clustering label set, updating the image block label sequence and the fragment label sequence by performing an update operation; and splitting the tracklet based on the updated image block label sequence; wherein the update operation comprises: updating the fragment label sequence based on a current continuous fragment corresponding to a current fragment label in the fragment label sequence, a previous continuous fragment corresponding to a previous fragment label previous to the current fragment label, and a next continuous fragment corresponding to a next fragment label following the current fragment label; and updating the image block label sequence based on the updated fragment label sequence.

According to an aspect of the present disclosure, there is provided a device for improving multi-object tracking. The device comprises: a memory, having instructions stored thereon; and at least one processor, coupled to the memory and configured to execute the instructions to perform a split operation on each of a plurality of tracklets, for corresponding objects respectively, provided by a multi-object tracking model; wherein the split operation comprises: determining an appearance feature sequence corresponding to an image block sequence of the tracklet; determining a clustering label set by clustering a plurality of appearance features in the appearance feature sequence; determining, based on the clustering label set, an image block label sequence composed of clustering labels of appearance features of image blocks in the image block sequence; determining a fragment label sequence corresponding to continuous fragments, having the same clustering labels, in the image block label sequence, wherein each of fragment labels in the fragment label sequence is the same clustering label of a corresponding continuous fragment; in a case where a length of the fragment label sequence is greater than the number of types of the clustering labels in the clustering label set, updating the image block label sequence and the fragment label sequence by performing an update operation; and splitting the tracklet based on the updated image block label sequence; wherein the update operation comprises: updating the fragment label sequence based on a current continuous fragment corresponding to a current fragment label in the fragment label sequence, a previous continuous fragment corresponding to a previous fragment label previous to the current fragment label, and a next continuous fragment corresponding to a next fragment label following the current fragment label; and updating the image block label sequence based on the updated fragment label sequence.

According to an aspect of the present disclosure, there is provided a computer-readable non-transitory storage medium storing a program thereon. The program, when executed by a computer, causes the computer to perform a split operation on each of a plurality of tracklets, for corresponding objects respectively, provided by a multi-object tracking model; wherein the split operation comprises: determining an appearance feature sequence corresponding to an image block sequence of the tracklet; determining a clustering label set by clustering a plurality of appearance features in the appearance feature sequence; determining, based on the clustering label set, an image block label sequence composed of clustering labels of appearance features of image blocks in the image block sequence; determining a fragment label sequence corresponding to continuous fragments, having the same clustering labels, in the image block label sequence, wherein each of fragment labels in the fragment label sequence is the same clustering label of a corresponding continuous fragment; in a case where a length of the fragment label sequence is greater than the number of types of the clustering labels in the clustering label set, updating the image block label sequence and the fragment label sequence by performing an update operation; and splitting the tracklet based on the updated image block label sequence; wherein the update operation comprises: updating the fragment label sequence based on a current continuous fragment corresponding to a current fragment label in the fragment label sequence, a previous continuous fragment corresponding to a previous fragment label previous to the current fragment label, and a next continuous fragment corresponding to a next fragment label following the current fragment label; and updating the image block label sequence based on the updated fragment label sequence.

The beneficial effects of the methods, devices and storage media of the present disclosure include: improving the accuracy of multi-object tracking.

BRIEF DESCRIPTION OF THE DRAWINGS

Embodiments of the present disclosure will be described below with reference to the accompanying drawings, which will help to more easily understand the above and other objects, features and advantages of the present disclosure. The accompanying drawings are merely intended to illustrate the principles of the present disclosure. The sizes and relative positions of units are not necessarily drawn to scale in the accompanying drawings. The same reference numbers may denote the same features. In the accompanying drawings.

DETAILED DESCRIPTION OF THE INVENTION

Hereinafter, exemplary embodiments of the present disclosure will be described combined with the accompanying drawings. For the sake of clarity and conciseness, the specification does not describe all features of actual embodiments. However, it should be understood that many decisions specific to the embodiments may be made in developing any such actual embodiment, so as to achieve specific objects of a developer, and these decisions may vary as embodiments are different.

It should also be noted herein that, to avoid the present disclosure from being obscured due to unnecessary details, only those device structures closely related to the solution according to the present disclosure are shown in the accompanying drawings, while other details not closely related to the present disclosure are omitted.

It should be understood that, the present disclosure will not be limited only to the described embodiments due to the following description with reference to the accompanying drawings. Herein, where feasible, embodiments may be combined with each other, features may be substituted or borrowed between different embodiments, and one or more features may be omitted in one embodiment.

Computer program code for performing operations of various aspects of embodiments of the present disclosure can be written in any combination of one or more programming languages, the programming languages including object-oriented programming languages, such as Java, Smalltalk, C++ and the like, and further including conventional procedural programming languages, such as "C" programming language or similar programming languages.

Methods of the present disclosure can be implemented by circuitry having corresponding functional configurations. The circuitry includes circuitry for a processor.

Figure 1:
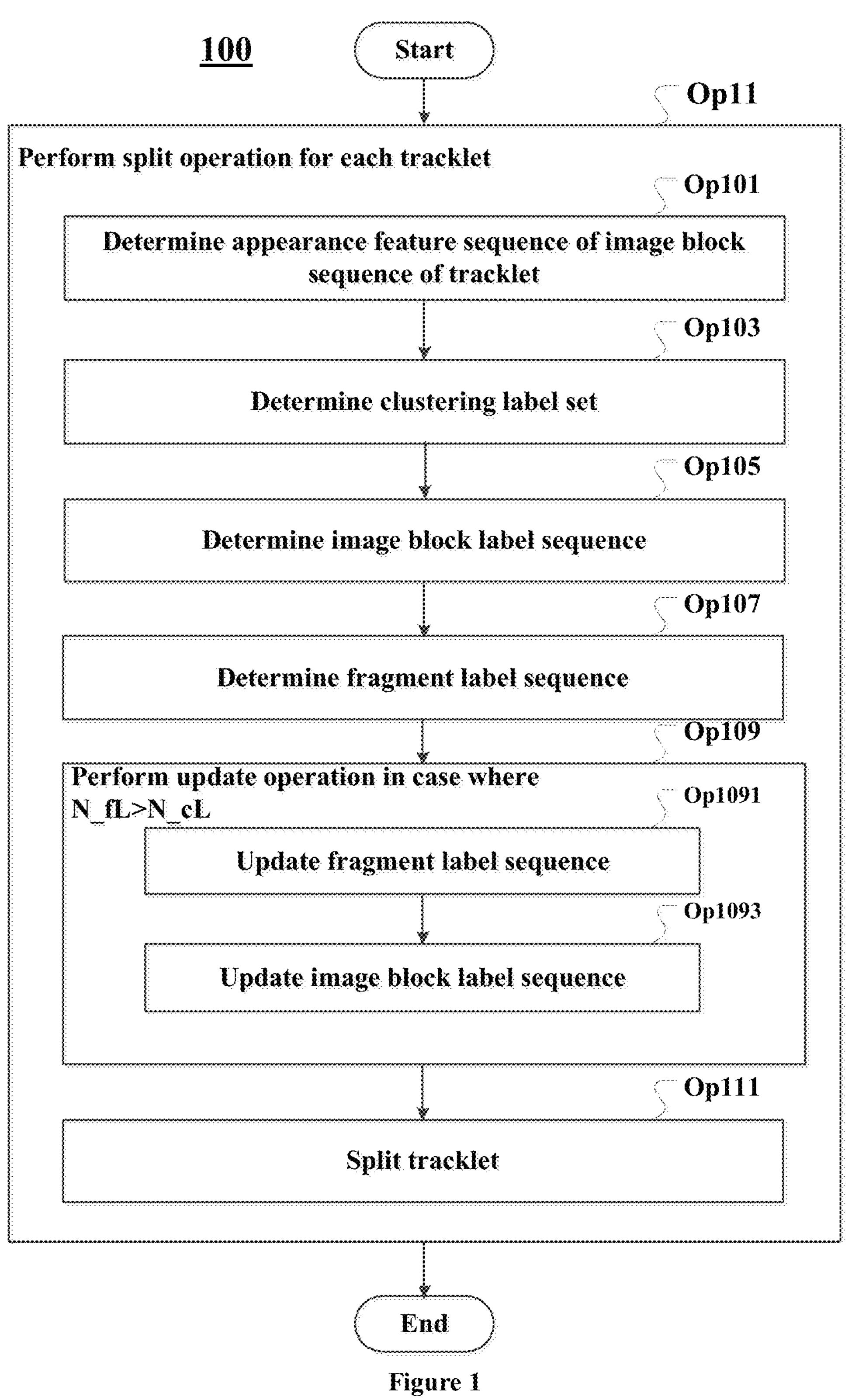
FIG. 1 illustrates an exemplary flowchart of a method for improving multi-object tracking according to an embodiment of the present disclosure.

An aspect of the present disclosure relates to a method for improving Multi-object Tracking (MOT). The method can be implemented with a computer. FIG. 1 illustrates an exemplary flowchart of a method 100 for improving multi-object tracking according to an embodiment of the present disclosure.

The method 100 comprises operation Op11 of: performing a split operation Op_sp on each (e.g., tracklet Trk[o]) of a plurality of tracklets (e.g., a tracklet Trk[oStart] to a tracklet Trk[oEnd]), for corresponding objects (e.g., an object Obj[oStart] to an object Obj[oEnd]) respectively, provided by a multi-object tracking model MOT-M. The method 100 can be regarded as a post-processing method of multi-object tracking. For a case where the tracklet Trk[oStart] to the tracklet Trk[oEnd] have been provided by the multi-object tracking model MOT-M, "oEnd-oStart+1" split operations can be performed. The multi-object tracking model MOT-M can determine tracklets of respective objects in a video based on input video segments. Any tracklet Trk[o] is represented by an image block sequence Seq_B[o]. The mage block sequence Seq_B[o] can be represented as: B[bStart], B[bStart+1], . . . , B[bEnd−1], B[bEnd]. Any image block B[b] in Seq_B[o] indicates an image of an object Obj[o] at a corresponding time. The mage block sequence Seq_B[o] is sorted in a time order. A time attribute value of the image block B[b] is a time of a corresponding video frame captured by a camera. The tracklet Trk[o] can come from either a single-camera based video segment or a multi-camera based video segment (that is, the MOT-M can be a multi-camera multi-object tracking model). It should be noted that: due to factors such as occlusion, illumination, attitude changes and the like, the tracklet Trk[o] provided by the model MOT-M may involve a case where it includes tracking sub-fragments of different objects that are not the object Obj[o], that is, multiple tracklets that were originally for multiple objects are determined as tracklets for one object. This reduces the accuracy of multi-object tracking, and thus in order to improve the performance of multi-object tracking, it is possible to perform a split operation Op_sp to attempt to split a single tracklet into multiple tracklets corresponding to the actual object number, so as to correct the aforementioned deficiencies.

As shown in FIG. 1, the split operation Op_sp may comprise: Operations Op101 to Op111.

In operation Op101, an appearance feature sequence Seq_Fa[o] corresponding to an image block sequence Seq_B [o] of the tracklet Tkr[o] is determined:

$$Fa[bStart], Fa[bStart+1], \ldots, Fa[bEnd-1], Fa[bEnd].$$

Appearance feature extraction is a routine operation of object tracking, which is implemented, for example, by utilizing a feature extraction part of a neural network. An appearance feature Fa[b] corresponds to an image block B[b]. The appearance feature can be provided by the MOT-M or by an independent feature extractor (e.g., a ReID model).

In operation Op103, a clustering label set cLS is determined by clustering a plurality of appearance features in the appearance feature sequence Seq_Fa[o]: {cL[cStart], . . . , cL[cEnd]}. The number N_cL of clustering classifications obtained through clustering can be represented as: N_cL=cEnd-cStart+1. A label of a clustering classification cL[c] can be represented by its index "c". For example, for the convenience of discussion, when the clustering label set cLS has 5 classifications, the 5 classifications can be simply represented as C1, C2, C3, C4, C5.

In operation Op105, an image block label sequence Seq_bL composed of clustering labels of appearance features of image blocks in the image block sequence Seq_B[o] is determined based on the clustering label set cLS:

$$B[bStart].bL, B[bStart+1].bL, \ldots, B[bEnd-1].bL, B[bEnd].bL.$$

Where, B[b].bL is a label of a clustering classification for the appearance feature Fa[b] of the image block B[b], which is abbreviated as an "image block label". For example, if the clustering label Fa[b].cL of Fa[b] is "C1", then the image block label B[b].bL of the image block B[b] is "C1".

In operation Op107, a fragment label sequence Seq_fL (e.g., fL[fStart], . . . , fL[fEnd]) corresponding to continuous fragments, having the same clustering labels, in the image block label sequence Seq_bL, is determined, wherein each fL[f] of fragment labels in the fragment label sequence Seq_fL is the same clustering label of a corresponding continuous fragment Fg[f]. For example, if an image block label of each image block in continuous fragments B[1] to B[32] in Seq_bL is "C1" and image block labels of B[33] to B[128] are all "C2", then the image blocks B[1] to B[32] form a continuous fragment Fg[1], the image block fragments B[33].bL to B[128].bL form a continuous fragment Fg[2], a label (i.e., fragment label fL[1]) of the fragment Fg[1] is C1, a label (i.e., fragment label fL[2]) of the fragment Fg[2] is C2, and the fragment label sequence Seq_FL is: C1, C2. This has been shown in Table 1.

TABLE 1

| | | | | | | | |
|---|---|---|---|---|---|---|---|
| Seq_B | B[1] | . . . | B[32] | B[33] | . . . | B[128] | . . . |
| Seq_Fa | Fa[1] | . . . | Fa[32] | Fa[33] | . . . | Fa[128] | . . . |
| Fa.cL | C1 | . . . (C1) | C1 | C2 | . . . (C2) | C2 | C3, . . . |
| B.bL (Seq_bL) | C1 | . . . (C1) | C1 | C2 | . . . (C2) | C2 | C3, . . . |
| Fg | Fg[1]: B[1].bL to B[32].bL (a sequence of 32 labels "C1") | | | Fg[2]: B[33].bL to B128].bL (a sequence of 96 labels "C2") | | | Fg[3], . . . |
| fL (Seq_fL) | C1 | | | C2 | | | C3, . . . |

Each continuous fragment Fg is a fragment (i.e., a subsequence) of the sequence Seq_bL, and a "start position" attribute (Fg.start) and an "end position" attribute (Fg.end) can be provided for each Fg to record start and end positions of Fg, so that each member in Fg is accessible in a case where an index of Fg is known. If a certain Fg is updated, it means that Seq_BL is also updated.

In operation Op109, in a case where a length N_fL of the fragment label sequence Seq_fL is greater than the number N_cL of types of the clustering labels in the clustering label set cLS, the image block label sequence Seq_bL and the fragment label sequence Seq_fL are updated by performing an update operation Op_ud. The length N_fL is the number of the continuous fragments Fg of the sequence Seq_bL, i.e., the member number of the sequence Seq_fL.

The update operation Op_ud comprises: operations Op1091 and Op1093. In operation Op1091, the fragment label sequence Seq_fL is updated based on a current continuous fragment cFg corresponding to a current fragment label cfL in the fragment label sequence, a previous continuous fragment pFg corresponding to a previous fragment label pfL previous to the current fragment label, and a next continuous fragment nFg corresponding to a next fragment label nfL following the current fragment label (the "update" here means changing fragment labels at relevant positions under reasonable conditions). In operation Op1093, the image block label sequence Seq_bL is updated based on the updated fragment label sequence (the "update" here means changing fragment labels at relevant positions under reasonable conditions).

In operation Op111, the tracklet Trk[o] is split based on the updated image block label sequence. For example, if the updated image block label sequence includes 128 image block labels, first to 64-th image block labels (clustering labels) are "C11" and 65-th to 128-th image block labels are "C12", then at a position between the 64-th image block and the 65-th image block, the image block sequence of the tracklet Trk[o] is split into two image block sequences corresponding to different objects, that is, the tracklet Trk[o] is split into two tracklets.

The image block sequence Seq_B[o] may contain some low-quality image blocks, which are disadvantageous to obtaining a better split result. In this regard, it is possible to consider performing appropriate filtering on image blocks. In an embodiment, the split operation Op_sp in the method 100 further comprises: updating the clustering label set by removing a noise cluster Cns in the clustering label set cLS; and updating the image block sequence by removing image blocks in the image block sequence Seq_B[o] which correspond to the noise cluster. The noise cluster Cns satisfies: the number of the corresponding image blocks of the noise cluster is lower than a predetermined threshold, and an average image block detection score of the corresponding image blocks is lower than a first score threshold. The number of noise clusters in the clustering label set cLS may be zero, 1 or more. An image block corresponding to a noise cluster may be referred to as a noise image block, which is disadvantageous to determining accurate split points, and thus the noise image block is removed. After the noise image blocks are removed, operation Op105 and subsequent operations are then performed.

In an embodiment, the update operation Op_ud of the method 100 comprises: in a case where the previous fragment label is same as the next fragment label (i.e., pfL=nfL), if a length cFg.Le of the current continuous fragment is less than or equal to a first length threshold (Length1), updating the current fragment label to the previous fragment label, and updating all clustering labels in the current continuous fragment to the previous fragment label; and otherwise, updating the previous fragment label to a new clustering label (i.e., a clustering label absent in the clustering label set), updating all clustering labels in the previous continuous fragment to the new clustering label, and updating the clustering label set by adding the new clustering label into the clustering label set. An example of changes in the labels before and after the update is as shown in Table 2.

TABLE 2

| | fL[i − 1] (pfL) | fL[i] (cfL) | fL[i + 1] (nfL) |
|---|---|---|---|
| Before update (N_cL = 12) | C1 | C2 | C1 |
| cFg.Len ≤ Lenth1 after the update | C1 | C1 | C1 |
| cFg.Len > Lenth1 after the update (N_cL = 13) | C13 | C2 | C1 |

In an embodiment, the update operation Op_ud of the method 100 comprises: in a case where the previous fragment label pfL is different from the next fragment label nfL, keeping image block labels of the previous continuous fragment, the current continuous fragment, and the next continuous fragment unchanged.

In an embodiment, the update operation Op_ud of the method 100 comprises: in a case of selecting each of fragment labels from a second fragment label to a second to last fragment label in the fragment label sequence as the current fragment label respectively, determining whether to update the fragment label sequence. After the current fragment label traverses each of the fragment labels, from the second fragment label to the second to last fragment label, in the fragment label sequence, in a case where it is determined that no fragment label update operation occurs during the traversing operation, a fragment label, in the fragment label sequence, that appears for a second time relative to a previous fragment label sequence is replaced with a new fragment label. At the same time, the new fragment label is added into the clustering label set so as to update the clustering label set.

Figure 2:
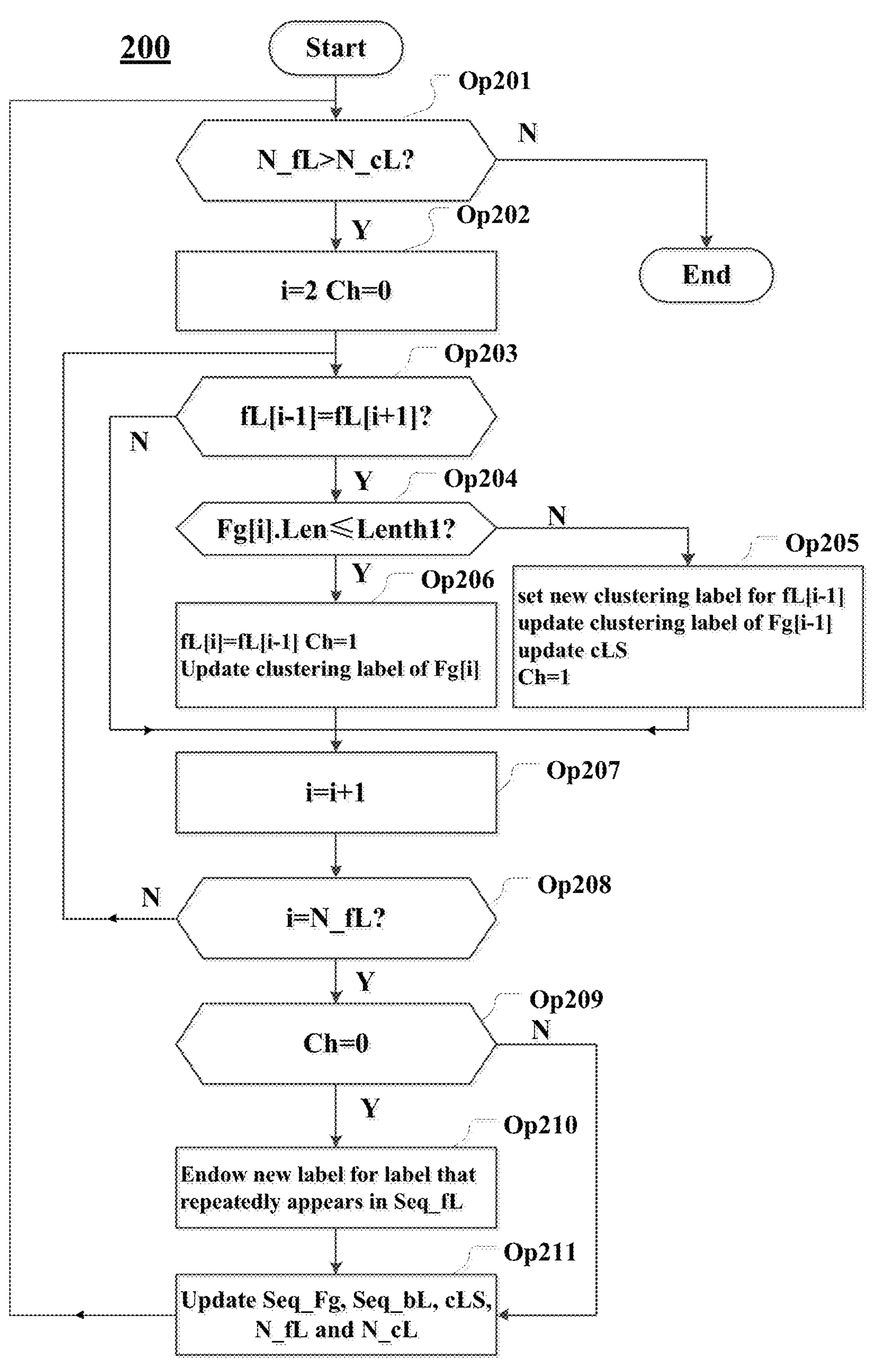
FIG. 2 illustrates an exemplary flowchart of a method for an update operation according to an embodiment of the present disclosure.

FIG. 2 illustrates an exemplary flowchart of a method 200 for an update operation Op_ud according to an embodiment of the present disclosure.

In operation Op201, it is determined whether N_fL is greater than N_cL. If a determination result is "yes" (represented by "Y" in the figure), then operation Op202 is performed; if a determination result is "no" (represented by "N" in the figure), then the method 200 ends.

In operation Op202, an index i that records the current fragment label is set to 2, and an update flag Ch is set to "0" ("O" indicates that no update occurs).

In operation Op203, it is determined whether the current fragment label fL[i−1] is same as the next fragment label fL[i+1]. If a determination result is "Y", then operation Op204 is performed; if a determination result is "N", then operation Op207 is performed.

In operation Op204, it is determined whether a length Fg[i]. Len of the current continuous fragment is less than or equal to a predetermined threshold Length1. If a determination result is "Y", then operation Op206 is performed; if a determination result is "N", then operation Op205 is performed.

In operation Op205, a new clustering label is set for fL[i−1], the clustering label of fL[i−1] is updated, cLS is updated, and Ch is endowed with a value 1 ("1" indicates that an update occurs). The set new clustering label is a clustering label absent in the clustering label set cLS. For example, if labels in cLS currently are numbered to "C30", then the new clustering label may be C31". Since Fg[i−1] is a subsequence of Seq_bL, updating the clustering label of Fg[i−1] means that Seq_bL is updated.

In operation Op206, fL[i] is updated to fL[i−1], the clustering label of Fg[i] is updated, and Ch is endowed with a value 1 ("1" indicates that an update occurs). Updating the clustering label of Fg[i] means that Seq_bL is updated.

In operation Op207, the index i of the current fragment label is added by 1.

In operation Op208, it is determined whether the index i of the current fragment label is equal to N-fL. If a determination result is "Y", then operation Op209 is performed; if a determination result is "N", then operation Op203 is performed.

In operation Op209, it is determined whether Ch is "0". That is, it is determined whether the fragment label is changed in a process during which i traverses the fragment labels from the second fragment label to the second to last fragment label. If a determination result is "Y", then operation Op210 is performed; if a determination result is "N", then operation Op211 is performed.

In operation Op210, a fragment label, in the fragment label sequence, that appears for a second time relative to a previous fragment label sequence is replaced with a new fragment label. For example, for Seq_fL: C4, C2, C3, C4, C1, C5, C4, after replacing, an updated Seq_fLis: C4, C2, C3, C6, C1 C5, C7.

In operation Op211, Seq_Fg, Seq_bL, cLS, N_fL, N_cL are updated based on the current Seq_fL. After operation Op211 is performed, the process returns to operation Op201. cLS is updated so that cLS is composed of fragment labels in Seq_fL. N_fL is updated so that N_fL is equal to the number of members in the current Seq_fL. N-cL is updated so that N_cL is equal to the number of elements in the updated cLS.

To solve the problem that one object exists in multiple different tracklets, the method for improving multi-object tracking of the present disclosure thus can further comprise: performing a merge operation on a plurality of updated tracklets obtained by performing the splitting operation on the plurality of tracklets.

Figure 3:
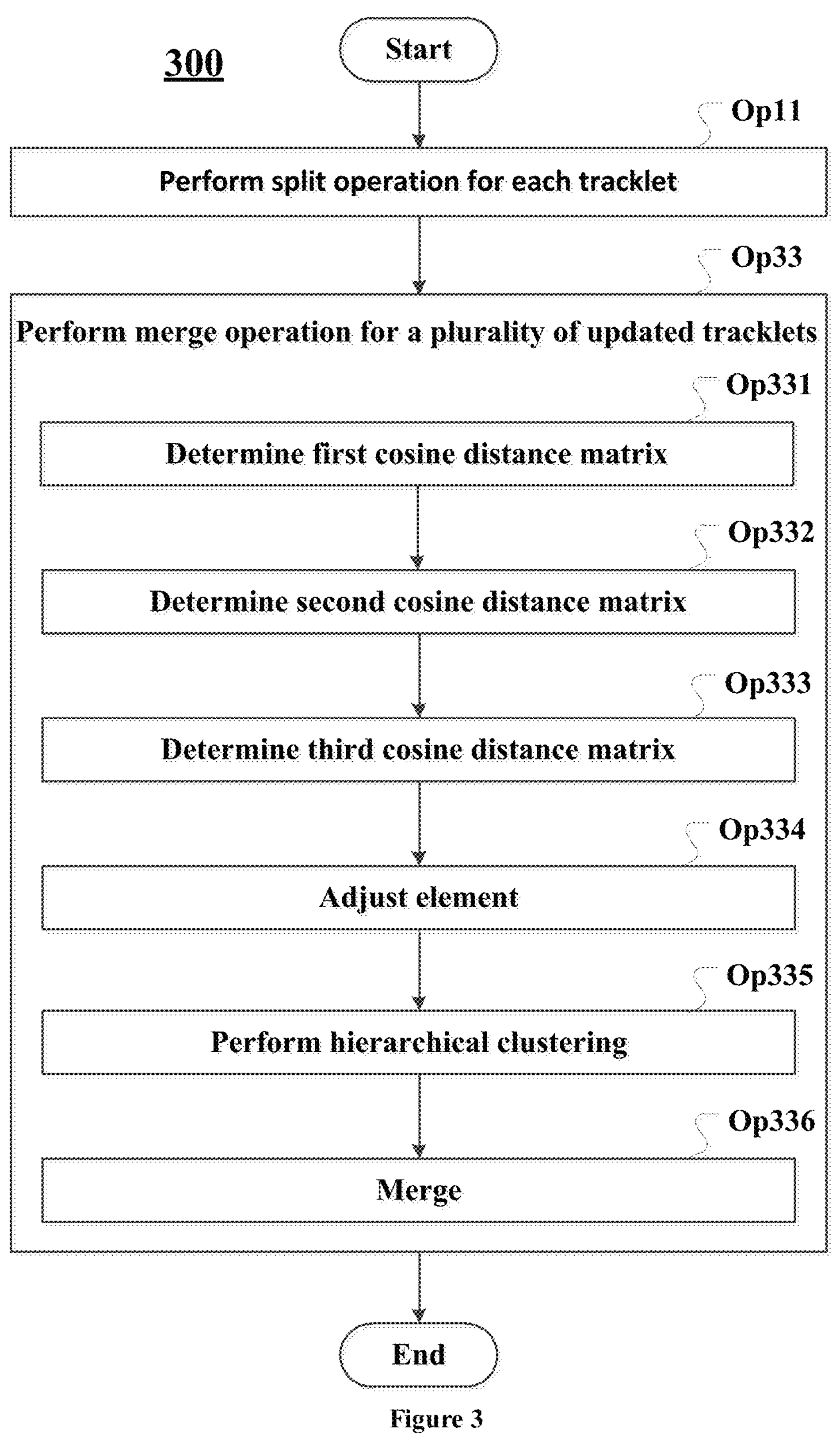
FIG. 3 illustrates an exemplary flowchart of a method for improving multi-object tracking according to an embodiment of the present disclosure.

FIG. 3 illustrates an exemplary flowchart of a method 300 for improving multi-object tracking according to an embodiment of the present disclosure. The method 300 comprises operations Op11 and Op33. In other words, the method 100 can also comprise operation Op33.

Operation Op11 is same as the operation in the method 100: performing a split operation Op_sp on each (e.g., tracklet Trk[o]) of a plurality of tracklets (e.g. tracklet Trk[oStart] to tracklet Trk[oEnd]), for corresponding objects (e.g., object Obj[oStart] to object Obj[oEnd]) respectively, provided by a multi-object tracking model MOT-M.

In operation Op33, a merge operation Op_mg is performed on a plurality of updated tracklets obtained by performing the splitting operation on the plurality of tracklets. As shown in FIG. 3, the merge operation Op_mg comprises operations Op331 to Op336.

In operation Op331, a first cosine distance matrix W of the plurality of updated tracklets is determined based on a first type of appearance features of respective updated tracklets associated with image block detection scores.

In operation Op332, a second cosine distance matrix D of the plurality of updated tracklets is determined based on a second type of appearance features of respective updated tracklets associated with most similar image block pairs between tracklets.

In operation Op333, a Hadamard product of the first cosine distance matrix W and the second cosine distance matrix D is determined as a third cosine distance matrix H.

In operation Op334, based on information of an image block pair for an element in the third cosine distance matrix H, the element is adjusted.

In operation Op335, hierarchical clustering is performed on the plurality of updated tracklets based on the adjusted third cosine distance matrix In operation Op336, a plurality of updated tracklets belonging to the same hierarchical clustering classification are merged based on a clustering result of the hierarchical clustering.

In an example, a first type of appearance feature of a current updated tracklet is a weighted average value of a result obtained by performing weighted averaging on appearance features of corresponding image blocks using image block detection scores; and in performing the weighted summation, the weighted summation is only performed on appearance features of image blocks having image block detection scores greater than or equal to a second score threshold. For example, a first type of appearance feature $f_{T_i}$ of an updated tracklet $T_i$ is determined according to equation (1).

$$f_{T_i} = \frac{1}{N_i}\sum_{k=1}^{N_i}(s_k^i f_k^i),\ s_k^i \geq s_{th} \tag{1}$$

Where, $S_{th}$ is a predetermined second score threshold, $$S_k^i$$

is a detection score of a k-th image block in the tracklet $T_i$, $$f_k^i$$

is an appearance feature of the k-th image block, and $N_i$ is the number of image blocks satisfying detection score conditions. $S_{th}$ can take a larger value, so as to select image blocks of higher quality (high credibility, high importance) to determine a first type of appearance feature of a tracklet. The appearance feature and the detection score can be either given by the model MOT-M or respectively provided by an independent feature extractor or detector. Correspondingly, the element $W_{i,j}$ of the first cosine distance matrix W can be represented as equation (2).

$$w_{i,j} = 1 - \cos(f_{T_i}, f_{T_j}) \tag{2}$$

Where, $$\cos(f_{T_i}, f_{T_j})$$

is a cosine similarity between the appearance features $$f_{T_i} \text{ and } f_{T_j}.$$

In an example, referring to equation (3), an element $d_{i,j}$, in the second cosine distance matrix D and associated with a first tracklet $T_i$ and a second tracklet $T_j$ in the plurality of updated tracklets, is an average value of cosine distances of appearance feature pairs of a plurality of most similar image block pairs between the first tracklet and the second tracklet.

$$d_{i,j} = \frac{1}{M}\sum\nolimits_{m=1}\left(1 - \cos\left(f_m^i, f_m^j\right)\right) \tag{3}$$

Where, it is possible to calculate a cosine similarity between an image block in the tracklet $T_i$ and an image block in the tracklet $T_j$ (the two image blocks form an image pair) based on appearance features of the image blocks, and after the obtained cosine similarities are arranged in a descending order, appearance feature pairs of a plurality of M most similar image block pairs corresponding to top M cosine similarities are taken to calculate the element $d_{i,j}$.

Based on information of an image block pair for an element $h_{i,j}$ in the third cosine distance matrix H, adjusting the element comprises:

(1) if the number of overlapping image blocks of two corresponding tracklets of the element is greater than a first overlapping threshold, adjusting the element to a first value greater than or equal to 1;

(2) if an absolute value of a time interval between two corresponding tracklets of the element is greater than a first time threshold, adjusting the element to a second value greater than or equal to 1;

(3) if the element $h_{i,j}$ is a diagonal element of the third cosine distance matrix H, adjusting the element to a third value greater than or equal to 1.

The first, second and third values are, for example, 1, a value close to 2 or greater. The first, second and third values can be equal.

In an example, based on a clustering result of the hierarchical clustering, merging a plurality of updated tracklets belonging to the same hierarchical clustering classification comprises: connecting a plurality of updated tracklets belonging to the same hierarchical clustering classification, in a time order, as a merged tracklet; determining whether a case where there are a plurality of image blocks for the same time exists in an image block sequence of the merged tracklet; and in a case where a determination result is "yes", performing the following operation to update the merged tracklet; removing, from the image block sequence, other image blocks than an image block with a highest detection score among the plurality of image blocks.

The update operation will be described by way of examples below.

Figures 4, 5:
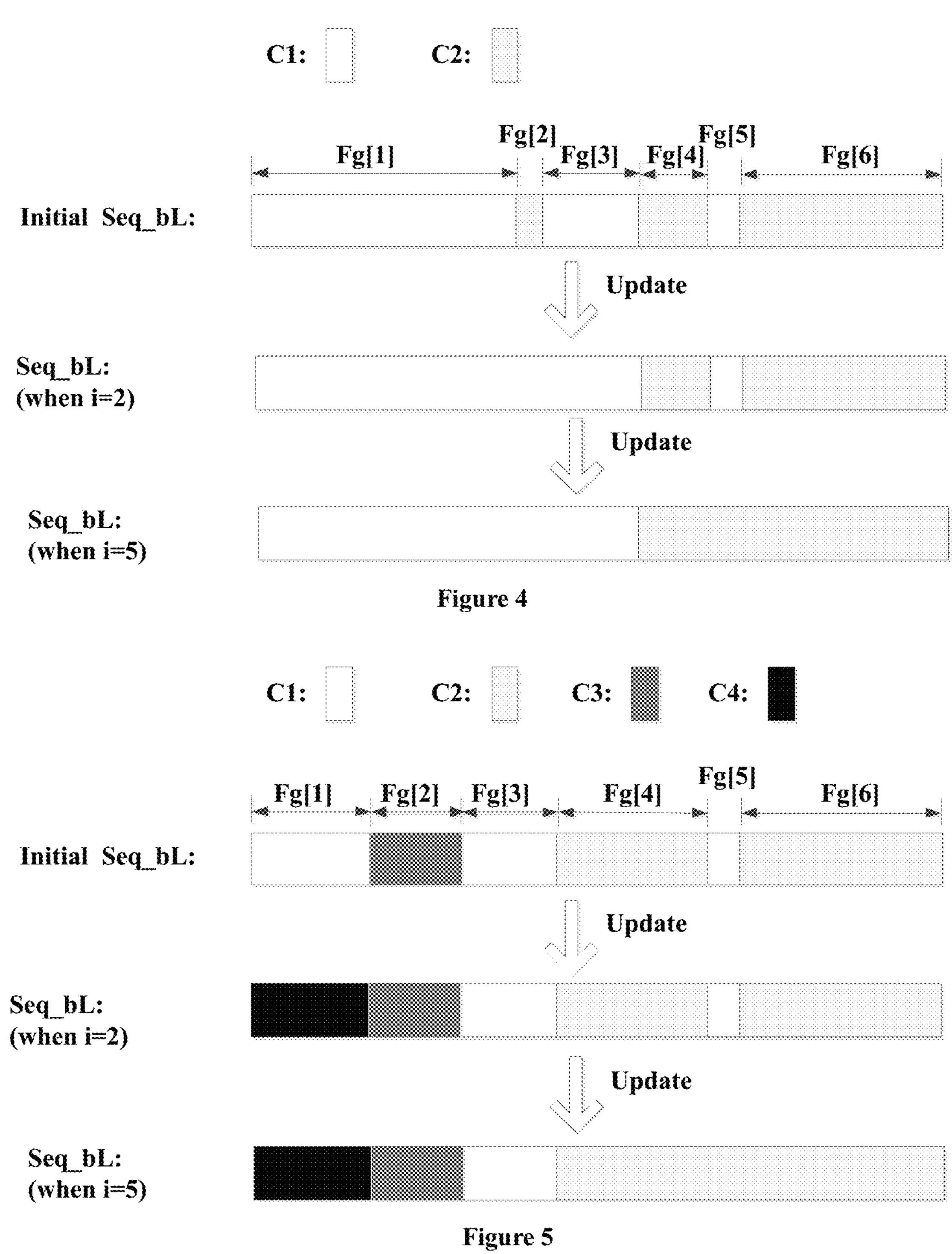
FIG. 4 illustrates a schematic diagram of changes in an image block label sequence according to an embodiment of the present disclosure.
FIG. 5 illustrates another schematic diagram of changes in an image block label sequence according to an embodiment of the present disclosure.

FIG. 4 illustrates a schematic diagram of changes in an image block label sequence according to an embodiment of the present disclosure. As shown in FIG. 4, an initial image block label sequence Seq_bL contains two types of image block labels distinguished by different colors: C1 and C2; according to changes in the labels, Seq_bL is divided into 6 sub-fragments, namely 6 continuous fragments Fg[1], Fg[2], Fg[3], Fg[4], Fg[5], Fg[6]; an illustrated length of each continuous fragment is proportional to the number (i.e., the number of image blocks in a corresponding image block sub-fragment) of labels the continuous fragment contains. According to the method 200, in a process during which i traverses from 2 to 5: when i=2, since the length of the continuous fragment Fg[2] is less than the threshold Length1, a fragment label update occurs and all labels "C2" thereof are replaced with "C1"; when i=5, since the length of the continuous segment Fg[5] is less than the threshold Length1, a fragment label update occurs and all labels "C1" thereof are replaced with "C2".

FIG. 5 illustrates another schematic diagram of changes in an image block label sequence according to an embodiment of the present disclosure. As shown in FIG. 5, an initial image block label sequence Seq_bL contains three types of image block labels distinguished by different colors: C1, C2, C3; according to changes in the labels, Seq_bL is divided into 6 sub-fragments, namely 6 continuous fragments Fg[1], Fg[2], Fg[3], Fg[4], Fg[5], Fg[6]; an illustrated length of each continuous fragment is proportional to the number (i.e., the number of image blocks in a corresponding image block sub-fragment) of labels the continuous fragment contains. According to the method 200, in a process during which i traverses from 2 to 5: when i=2, since the continuous fragment Fg[2] is long enough and labels of two fragments previous and next to Fg[2] are the same, a fragment label update occurs and all labels "C1" of the fragment Fg[1] are replaced with a new label "C4"; when i=5, since the length of the continuous segment Fg[5] is less than the threshold Length1, a fragment label update occurs and all labels "C1" thereof are replaced with "C2".

Effects of the present disclosure will be described below.

TABLE 3

| Video | Initial tracklet number | Tracklet number after splitting by baseline method | Tracklet number after splitting by method 100 |
|---|---|---|---|
| MOT17-01 | 49 | 127 | 58 |
| MOT17-03 | 199 | 438 | 223 |
| MOT17-06 | 202 | 572 | 263 |

The effects of the method 100 are tested using a dataset MOT17 of a public testing platform in MOT field, with testing results being as shown in Table 3, wherein the baseline method is a "ReMOT" method (Yang F, Chang X, Sakti S, et al., ReMOT: A model-agnostic refinement for multiple object tracking; Image and Vision Computing, 2021, 106:104091.). The initial tracklet number is obtained through calculation by a "ByteTrack" model. With respect to the baseline method, the split method of the present disclosure can better suppress an "over-split". That is, it can effectively reduce false split points. Sources of these false split points include, but are not limited to, an object being occluded for a short time or a suddenly-turning object.

TABLE 4

| Dataset | Method | IDF1(%) | HOTA (%) | IDSW |
|---|---|---|---|---|
| MOT17 | Benchmark method | 77.3 | 63.1 | 2,196 |
| | Method 300 | 82.2 (+4.9) | 65.4 (+2.3) | 1,497 (−699) |
| MOT20 | Benchmark method | 75.2 | 61.3 | 1,223 |
| | Method 300 | 78.2 (+3.0) | 63.0 (+1.7) | 1,025 (−198) |

The effects of the method 300 are tested using datasets MOT17 and MOT20 of a public testing platform in MOT field, with testing results being as shown in Table 4, wherein the baseline method is a "ByteTrack" model. With respect to the baseline method, the method of the present disclosure has been somewhat improved in terms of all three performance characterization parameters. The testing demonstrates that operations of the present disclosure can make tracklets have better one-to-one correspondence to objects.

Figure 6:
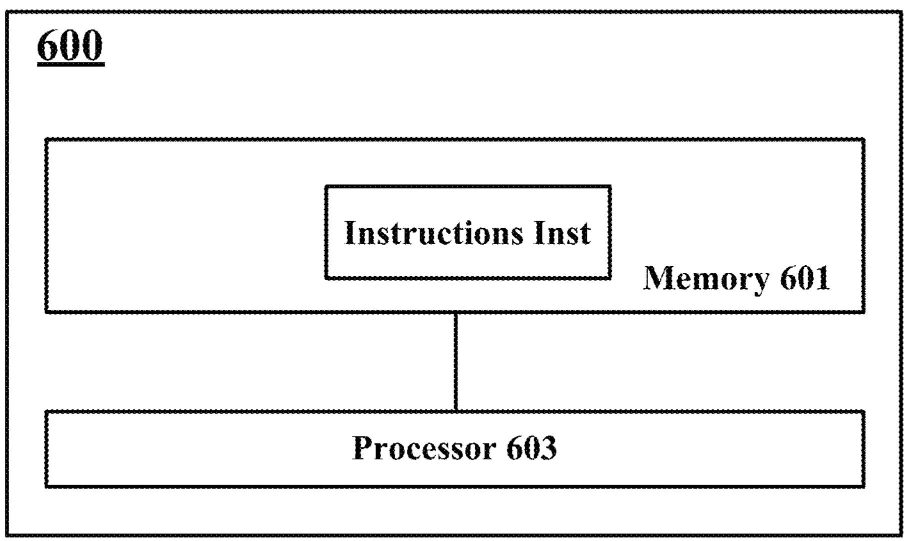
FIG. 6 is an exemplary block diagram of a device for improving multi-object tracking according to another embodiment of the present disclosure.

In an embodiment of the present disclosure, there is provided a device for improving multi-object tracking. Exemplary description will be made with reference to FIG. 6 below. FIG. 6 illustrates an exemplary block diagram of a device 600 for improving multi-object tracking according to an embodiment of the present disclosure. The device 600 comprises: a memory 601, having instructions Inst stored thereon; and at least one processor 603, coupled to the memory 601 and configured to execute the instructions to perform a split operation on each of a plurality of tracklets, for corresponding objects respectively, provided by a multi-object tracking model; wherein the split operation comprises: determining an appearance feature sequence corresponding to an image block sequence of the tracklet; determining a clustering label set by clustering a plurality of appearance features in the appearance feature sequence; determining, based on the clustering label set, an image block label sequence composed of clustering labels of appearance features of image blocks in the image block sequence; determining a fragment label sequence corresponding to continuous fragments, having the same clustering labels, in the image block label sequence, wherein each of fragment labels in the fragment label sequence is the same clustering label of a corresponding continuous fragment; in a case where a length of the fragment label sequence is greater than the number of types of the clustering labels in the clustering label set, updating the image block label sequence and the fragment label sequence by performing an update operation; and splitting the tracklet based on the updated image block label sequence; wherein the update operation comprises: updating the fragment label sequence based on a current continuous fragment corresponding to a current fragment label in the fragment label sequence, a previous continuous fragment corresponding to a previous fragment label previous to the current fragment label, and a next continuous previous to corresponding to a next fragment label following the current fragment label; and updating the image block label sequence based on the updated fragment label sequence. The instructions Inst have a corresponding relationship with the method 100. For the further configuration of the device 600, reference may be made to the description of the method 100 of the present disclosure. The instructions Inst can further comprise instructions that correspond to the merge operation, that is, the instructions Inst can also correspond to the method 300.

An aspect of the present disclosure provides a computer-readable non-transitory storage medium storing a program thereon, wherein the program, when executed by a computer, causes the computer to perform a split operation on each of a plurality of tracklets, for corresponding objects respectively, provided by a multi-object tracking model; wherein the split operation comprises: determining an appearance feature sequence corresponding to an image block sequence of the tracklet; determining a clustering label set by clustering a plurality of appearance features in the appearance feature sequence; determining, based on the clustering label set, an image block label sequence composed of clustering labels of appearance features of image blocks in the image block sequence; determining a fragment label sequence corresponding to continuous fragments, having the same clustering labels, in the image block label sequence, wherein each of fragment labels in the fragment label sequence is the same clustering label of a corresponding continuous fragment; in a case where a length of the fragment label sequence is greater than the number of types of the clustering labels in the clustering label set, updating the image block label sequence and the fragment label sequence by performing an update operation; and splitting the tracklet based on the updated image block label sequence; wherein the update operation comprises: updating the fragment label sequence based on a current continuous fragment corresponding to a current fragment label in the fragment label sequence, a previous continuous fragment corresponding to a previous fragment label previous to the current fragment label, and a next continuous fragment corresponding to a next fragment label following the current fragment label; and updating the image block label sequence based on the updated fragment label sequence. The program has a corresponding relationship with the method 100. For the further configuration of the program, reference may be made to the description of the method 100 of the present disclosure. The program can further comprise a portion that corresponds to the merge operation, that is, the program can also correspond to the method 300.

According to an aspect of the present disclosure, there is further provided an information processing apparatus.

Figure 7:
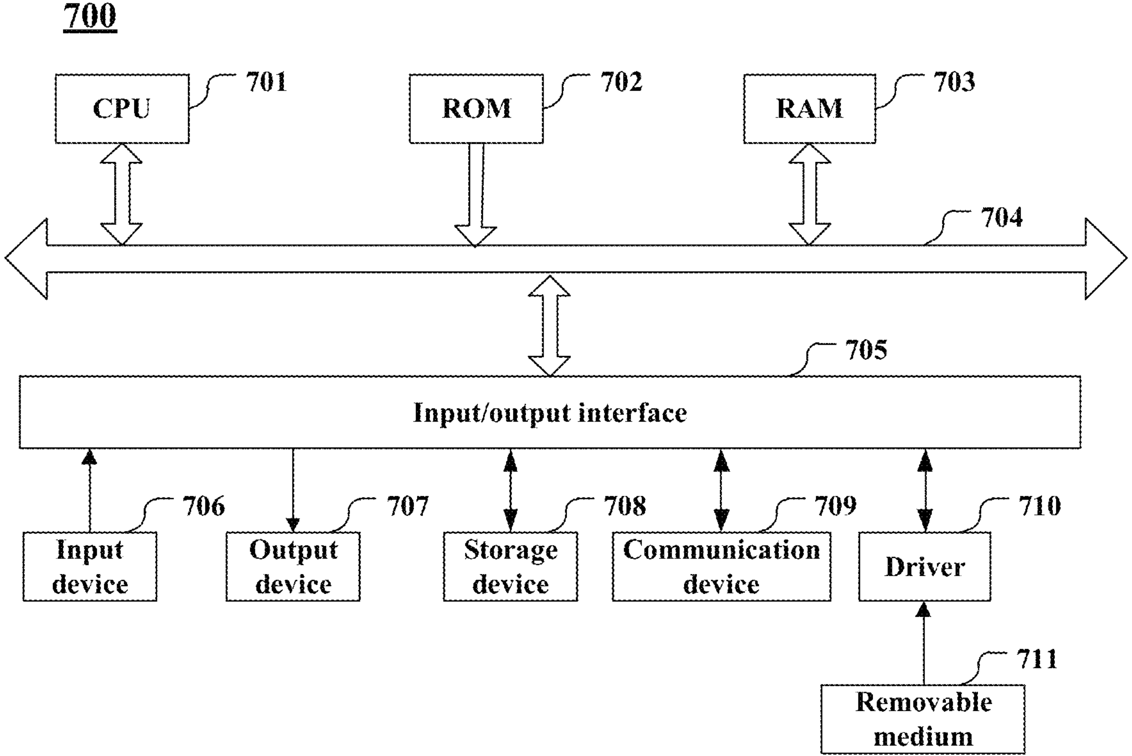
FIG. 7 is a schematic block diagram of an information processing apparatus according to an embodiment of the present disclosure.

The present disclosure also relates to an information processing apparatus. FIG. 7 is an exemplary block diagram of an information processing apparatus 700 according to an embodiment of the present disclosure. In FIG. 7, a Central Processing Unit (CPU) 701 executes various processing according to programs stored in a Read-Only Memory (ROM) 702 or programs loaded from a storage device 708 to a Random Access Memory (RAM) 703. In the RAM 703, data needed when the CPU 701 executes various processing and the like is also stored as needed.

The CPU 701, the ROM 702 and the RAM 703 are connected to each other via a bus 704. An input/output interface 705 is also connected to the bus 704.

The following components are connected to the input/output interface 705: an input device 706, including a soft keyboard and the like; an output device 707, including a display such as a Liquid Crystal Display (LCD) and the like, as well as a speaker and the like; the storage device 708 such as a hard disc and the like; and a communication device 709, including a network interface card such as an LAN card, a modem and the like. The communication device 709 executes communication processing via a network such as the Internet, a local area network, a mobile network or a combination thereof.

A driver 710 is also connected to the input/output interface 705 as needed. A removable medium 711 such as a semiconductor memory and the like is installed on the driver 710 as needed, such that programs read therefrom are installed in the storage device 708 as needed.

The CPU 701 can run a program corresponding to a method for improving multi-object tracking.

The beneficial effects of the methods, devices and storage media of the present disclosure include at least of: improving the accuracy of multi-object tracking. Specifically, the methods, devices and storage media of the present disclosure can be used to perform post-processing on a tracklet set provided by an MOT-M and output an updated tracklet set which has improved accuracy. The split operation of the present disclosure can reduce a case where one tracklet includes multiple different objects and, as compared with other split methods, can effectively reduce a false split and suppress an over-split. The merge operation of the present disclosure can solve a problem that one object exists in multiple different tracklets. For an embodiment where a split operation and a merge operation are simultaneously included, an improvement effect will be more apparent, and the accuracy of an updated tracklet set is obviously improved. For the merge operation of the present disclosure, it not only simply considers average appearance features but also further considers detection credibility (i.e., detection scores of detection boxes) of different image blocks in one segment of trajectory, and it also considers distances between most similar detection block pairs (i.e., the most similar image block pairs) in two segments of trajectory. Therefore, it is advantageous to improving a merge effect.

As described above, according to the present disclosure, the principle of improving multi-object tracking has been disclosed. It should be noted that, the effects of the solution of the present disclosure are not necessarily limited to the above-mentioned effects, and in addition to or instead of the effects described in the preceding paragraphs, any of the effects as shown in the specification or other effects that can be understood from the specification can be obtained.

Although the present invention has been disclosed above through the description with regard to specific embodiments of the present invention, it should be understood that those skilled in the art can design various modifications (including, where feasible, combinations or substitutions of features between various embodiments), improvements, or equivalents to the present invention within the spirit and scope of the appended claims. These modifications, improvements or equivalents should also be considered to be included within the protection scope of the present invention.

It should be emphasized that, the term "comprise/include" as used herein refers to the presence of features, elements, steps or assemblies, but does not exclude the presence or addition of one or more other features, elements, steps or assemblies.

In addition, the methods of the various embodiments of the present invention are not limited to be executed in the time order as described in the specification or as shown in the accompanying drawings, and may also be executed in other time orders, in parallel or independently. Therefore, the execution order of the methods as described in the specification fails to constitute a limitation to the technical scope of the present invention.

APPENDIX

The present disclosure includes but is not limited to the following solutions.

1. A computer-implemented method for improving multi-object tracking, characterized by comprising: performing a split operation on each of a plurality of tracklets, for corresponding objects respectively, provided by a multi-object tracking model;

wherein the split operation comprises:

determining an appearance feature sequence corresponding to an image block sequence of the tracklet;

determining a clustering label set by clustering a plurality of appearance features in the appearance feature sequence;

determining, based on the clustering label set, an image block label sequence composed of clustering labels of appearance features of image blocks in the image block sequence;

determining a fragment label sequence corresponding to continuous fragments, having the same clustering labels, in the image block label sequence, wherein each of fragment labels in the fragment label sequence is the same clustering label of a corresponding continuous fragment;

in a case where a length of the fragment label sequence is greater than the number of types of the clustering labels in the clustering label set, updating the image block label sequence and the fragment label sequence by performing an update operation; and splitting the tracklet based on the updated image block label sequence;

wherein the update operation comprises:

updating the fragment label sequence based on a current continuous fragment corresponding to a current fragment label in the fragment label sequence, a previous continuous fragment corresponding to a previous fragment label previous to the current fragment label, and a next continuous fragment corresponding to a next fragment label following the current fragment label; and updating the image block label sequence based on the updated fragment label sequence.

2. The method according to Appendix 1, wherein the update operation comprises:

in a case where the previous fragment label is same as the next fragment label, if a length of the current continuous fragment is less than or equal to a first length threshold, updating the current fragment label to the previous fragment label, and updating all clustering labels in the current continuous fragment to the previous fragment label; and otherwise, updating the previous fragment label to a new clustering label, updating all clustering labels in the previous continuous fragment to the new clustering label, and updating the clustering label set by adding the new clustering label into the clustering label set.

3. The method according to Appendix 2, wherein the update operation comprises:

in a case where the previous fragment label is different from the next fragment label, keeping image block labels of the previous continuous fragment, the current continuous fragment, and the next continuous fragment unchanged.

4. The method according to Appendix 2, wherein the update operation comprises:

in a case of selecting each of fragment labels from a second fragment label to a second to last fragment label in the fragment label sequence as the current fragment label respectively, determining whether to update the fragment label sequence.

5. The method according to Appendix 4, wherein the update operation comprises:

after the current fragment label traverses each of the fragment labels from the second fragment label to the second to last fragment label in the fragment label sequence, in a case where it is determined that no fragment label update operation occurs during the traversing operation, replacing a fragment label, in the fragment label sequence, that appears for a second time relative to a previous fragment label sequence with a new fragment label.

6. The method according to Appendix 1, wherein the split operation comprises:

updating the clustering label set by removing a noise cluster in the clustering label set; and updating the image block sequence by removing image blocks in the image block sequence which correspond to the noise cluster; and the noise cluster satisfies: the number of the corresponding image blocks of the noise cluster is lower than a predetermined threshold, and an average image block detection score of the corresponding image blocks is lower than a first score threshold.

7. The method according to Appendix 1, characterized by further comprising: performing a merge operation on a plurality of updated tracklets obtained by performing the splitting operation on the plurality of tracklets;

wherein the merge operation comprises:

determining a first cosine distance matrix of the plurality of updated tracklets based on a first type of appearance features of respective updated tracklets associated with image block detection scores;

determining a second cosine distance matrix of the plurality of updated tracklets based on a second type of appearance features of respective updated tracklets associated with most similar image block pairs between tracklets;

determining a Hadamard product of the first cosine distance matrix and the second cosine distance matrix as a third cosine distance matrix;

based on information of an image block pair for an element in the third cosine distance matrix, adjusting the element;

performing hierarchical clustering on the plurality of updated tracklets based on the adjusted third cosine distance matrix; and based on a clustering result of the hierarchical clustering, merging a plurality of updated tracklets belonging to the same hierarchical clustering classification.

8. The method according to Appendix 7, wherein a first type of appearance feature of a current updated tracklet is a weighted average value of a result obtained by performing weighted averaging on appearance features of corresponding image blocks using image block detection scores; and in performing the weighted summation, the weighted summation is only performed on appearance features of image blocks having image block detection scores greater than or equal to a second score threshold.

9. The method according to Appendix 7, wherein an element, in the second cosine distance matrix, associated with a first tracklet and a second tracklet in the plurality of updated tracklets, is an average value of cosine distances of appearance feature pairs of a plurality of most similar image block pairs between the first tracklet and the second tracklet.

10. The method according to Appendix 7, wherein based on information of an image block pair for an element in the third cosine distance matrix, adjusting the element comprises:

if the number of overlapping image blocks of two corresponding tracklets for the element is greater than a first overlapping threshold, adjusting the element to a first value greater than or equal to 1.

11. The method according to Appendix 7, wherein based on information of an image block pair for an element in the third cosine distance matrix, adjusting the element comprises:

if an absolute value of a time interval between two corresponding tracklets for the element is greater than a first time threshold, adjusting the element to a second value greater than or equal to 1.

12. The method according to Appendix 7, wherein based on information of an image block pair for an element in the third cosine distance matrix, adjusting the element comprises:

adjusting a diagonal element of the third cosine distance matrix to a third value greater than or equal to 1.

13. The method according to Appendix 7, wherein based on a clustering result of the hierarchical clustering, merging a plurality of updated tracklets belonging to the same hierarchical clustering classification comprises:

connecting a plurality of updated tracklets belonging to the same hierarchical clustering classification, in a time order, as a merged tracklet;

determining whether a case where there are a plurality of image blocks for the same time exists in an image block sequence of the merged tracklet; and in a case where a determination result is "yes", performing the following operation to update the merged tracklet;

removing, from the image block sequence, other image blocks than an image block with a highest detection score among the plurality of image blocks.

14. A device for improving multi-object tracking, characterized by comprising:

a memory, having instructions stored thereon; and at least one processor coupled to the memory and configured to execute the instructions to perform a split operation on each of a plurality of tracklets, for corresponding objects respectively, provided by a multi-object tracking model;

wherein the split operation comprises:

determining an appearance feature sequence corresponding to an image block sequence of the tracklet;

determining a clustering label set by clustering a plurality of appearance features in the appearance feature sequence;

determining, based on the clustering label set, an image block label sequence composed of clustering labels of appearance features of image blocks in the image block sequence;

determining a fragment label sequence corresponding to continuous fragments, having the same clustering labels, in the image block label sequence, wherein each of fragment labels in the fragment label sequence is the same clustering label of a corresponding continuous fragment;

in a case where a length of the fragment label sequence is greater than the number of types of the clustering labels in the clustering label set, updating the image block label sequence and the fragment label sequence by performing an update operation; and splitting the tracklet based on the updated image block label sequence;

wherein the update operation comprises:

updating the fragment label sequence based on a current continuous fragment corresponding to a current fragment label in the fragment label sequence, a previous continuous fragment corresponding to a previous fragment label previous to the current fragment label, and a next continuous fragment corresponding to a next fragment label following the current fragment label; and updating the image block label sequence based on the updated fragment label sequence.

15. The device according to Appendix 14, wherein the update operation comprises:

in a case where the previous fragment label is same as the next fragment label, if a length of the current continuous fragment is less than or equal to a first length threshold, updating the current fragment label to the previous fragment label, and updating all clustering labels in the current continuous fragment to the previous fragment label; and otherwise, updating the previous fragment label to a new clustering label, updating all clustering labels in the previous continuous fragment to the new clustering label, and updating the clustering label set by adding the new clustering label into the clustering label set.

16. The device according to Appendix 15, wherein the update operation comprises:

in a case where the previous fragment label is different from the next fragment label, keeping image block labels of the previous continuous fragment, the current continuous fragment, and the next continuous fragment unchanged.

17. The device according to Appendix 15, wherein the update operation comprises:

in a case of selecting each of fragment labels from a second fragment label to a second to last fragment label in the fragment label sequence as the current fragment label respectively, determining whether to update the fragment label sequence.

18. The device according to Appendix 17, wherein the update operation comprises:

after the current fragment label traverses each of the fragment labels from the second fragment label to the second to last fragment label in the fragment label sequence, in a case where it is determined that no fragment label update operation occurs during the traversing operation, replacing a fragment label, in the fragment label sequence, that appears for a second time relative to a previous fragment label sequence with a new fragment label.

19. The device according to Appendix 14, wherein the at least one processor is further configured to execute the instructions to: perform a merge operation on a plurality of updated tracklets obtained by performing the splitting operation on the plurality of tracklets;

wherein the merge operation comprises:

determining a first cosine distance matrix of the plurality of updated tracklets based on a first type of appearance features of respective updated tracklets associated with image block detection scores;

determining a second cosine distance matrix of the plurality of updated tracklets based on a second type of appearance features of respective updated tracklets associated with most similar image block pairs between tracklets;

determining a Hadamard product of the first cosine distance matrix and the second cosine distance matrix as a third cosine distance matrix;

based on information of an image block pair for an element in the third cosine distance matrix, adjusting the element;

performing hierarchical clustering on the plurality of updated tracklets based on the adjusted third cosine distance matrix; and based on a clustering result of the hierarchical clustering, merging a plurality of updated tracklets belonging to the same hierarchical clustering classification.

20. A computer-readable non-transitory storage medium storing a program thereon, characterized in that the program, when executed by a computer, causes the computer to perform a split operation on each of a plurality of tracklets provided for corresponding objects respectively by a multi-object tracking model;

wherein the split operation comprises:

determining an appearance feature sequence corresponding to an image block sequence of the tracklet;

determining a clustering label set by clustering a plurality of appearance features in the appearance feature sequence;

determining, based on the clustering label set, an image block label sequence composed of clustering labels of appearance features of image blocks in the image block sequence;

determining a fragment label sequence corresponding to continuous fragments, having the same clustering labels, in the image block label sequence, wherein each of fragment labels in the fragment label sequence is the same clustering label of a corresponding continuous fragment;

in a case where a length of the fragment label sequence is greater than the number of types of the clustering labels in the clustering label set, updating the image block label sequence and the fragment label sequence by performing an update operation; and splitting the tracklet based on the updated image block label sequence;

wherein the update operation comprises:

updating the fragment label sequence based on a current continuous fragment corresponding to a current fragment label in the fragment label sequence, a previous continuous fragment corresponding to a previous fragment label previous to the current fragment label, and a next continuous fragment corresponding to a next fragment label following the current fragment label; and updating the image block label sequence based on the updated fragment label sequence.

The invention claimed is:

1. A computer-implemented method for improving multi-object tracking, characterized by comprising: performing a split operation on each of a plurality of tracklets, for corresponding objects respectively, provided by a multi-object tracking model;

wherein the split operation comprises:

determining an appearance feature sequence corresponding to an image block sequence of the tracklet;

determining a clustering label set by clustering a plurality of appearance features in the appearance feature sequence;

determining, based on the clustering label set, an image block label sequence composed of clustering labels of appearance features of image blocks in the image block sequence;

determining a fragment label sequence corresponding to continuous fragments, having the same clustering labels, in the image block label sequence, wherein each of fragment labels in the fragment label sequence is the same clustering label of a corresponding continuous fragment;

in a case where a length of the fragment label sequence is greater than the number of types of the clustering labels in the clustering label set, updating the image block label sequence and the fragment label sequence by performing an update operation; and splitting the tracklet based on the updated image block label sequence;

wherein the update operation comprises:

updating the fragment label sequence based on a current continuous fragment corresponding to a current fragment label in the fragment label sequence, a previous continuous fragment corresponding to a previous fragment label previous to the current fragment label, and a next continuous fragment corresponding to a next fragment label following the current fragment label; and updating the image block label sequence based on the updated fragment label sequence.

2. The method according to claim 1, wherein the update operation comprises:

in a case where the previous fragment label is same as the next fragment label, if a length of the current continuous fragment is less than or equal to a first length threshold, updating the current fragment label to the previous fragment label, and updating all clustering labels in the current continuous fragment to the previous fragment label; and otherwise, updating the previous fragment label to a new clustering label, updating all clustering labels in the previous continuous fragment to the new clustering label, and updating the clustering label set by adding the new clustering label into the clustering label set.

3. The method according to claim 2, wherein the update operation comprises:

in a case where the previous fragment label is different from the next fragment label, keeping image block labels of the previous continuous fragment, the current continuous fragment, and the next continuous fragment unchanged.

4. The method according to claim 2, wherein the update operation comprises:

in a case of selecting each of fragment labels from a second fragment label to a second to last fragment label in the fragment label sequence as the current fragment label respectively, determining whether to update the fragment label sequence.

5. The method according to claim 4, wherein the update operation comprises:

after the current fragment label traverses each of the fragment labels from the second fragment label to the second to last fragment label in the fragment label sequence, in a case where it is determined that no fragment label update operation occurs during the traversing operation, replacing a fragment label, in the fragment label sequence, that appears for a second time relative to a previous fragment label sequence with a new fragment label.

6. The method according to claim 1, wherein the split operation comprises:

updating the clustering label set by removing a noise cluster in the clustering label set; and updating the image block sequence by removing image blocks in the image block sequence which correspond to the noise cluster; and the noise cluster satisfies: the number of the corresponding image blocks of the noise cluster is lower than a predetermined threshold, and an average image block detection score of the corresponding image blocks is lower than a first score threshold.

7. The method according to claim 1, characterized by further comprising: performing a merge operation on a plurality of updated tracklets obtained by performing the splitting operation on the plurality of tracklets;

wherein the merge operation comprises:

determining a first cosine distance matrix of the plurality of updated tracklets based on a first type of appearance features of respective updated tracklets associated with image block detection scores;

determining a second cosine distance matrix of the plurality of updated tracklets based on a second type of appearance features of respective updated tracklets associated with most similar image block pairs between tracklets;

determining a Hadamard product of the first cosine distance matrix and the second cosine distance matrix as a third cosine distance matrix;

based on information of an image block pair for an element in the third cosine distance matrix, adjusting the element;

performing hierarchical clustering on the plurality of updated tracklets based on the adjusted third cosine distance matrix; and based on a clustering result of the hierarchical clustering, merging a plurality of updated tracklets belonging to the same hierarchical clustering classification.

8. The method according to claim 7, wherein a first type of appearance feature of a current updated tracklet is a weighted average value of a result obtained by performing weighted averaging on appearance features of corresponding image blocks using image block detection scores; and in performing the weighted summation, the weighted summation is only performed on appearance features of image blocks having image block detection scores greater than or equal to a second score threshold.

9. The method according to claim 7, wherein an element, in the second cosine distance matrix, associated with a first tracklet and a second tracklet in the plurality of updated tracklets, is an average value of cosine distances of appearance feature pairs of a plurality of most similar image block pairs between the first tracklet and the second tracklet.

10. The method according to claim 7, wherein based on information of an image block pair for an element in the third cosine distance matrix, adjusting the element comprises:

if the number of overlapping image blocks of two corresponding tracklets for the element is greater than a first overlapping threshold, adjusting the element to a first value greater than or equal to 1.

11. The method according to claim 7, wherein based on information of an image block pair for an element in the third cosine distance matrix, adjusting the element comprises:

if an absolute value of a time interval between two corresponding tracklets for the element is greater than a first time threshold, adjusting the element to a second value greater than or equal to 1.

12. The method according to claim 7, wherein based on information of an image block pair for an element in the third cosine distance matrix, adjusting the element comprises:

adjusting a diagonal element of the third cosine distance matrix to a third value greater than or equal to 1.

13. The method according to claim 7, wherein based on a clustering result of the hierarchical clustering, merging a plurality of updated tracklets belonging to the same hierarchical clustering classification comprises:

connecting a plurality of updated tracklets belonging to the same hierarchical clustering classification, in a time order, as a merged tracklet;

determining whether a case where there are a plurality of image blocks for the same time exists in an image block sequence of the merged tracklet; and in a case where a determination result is "yes", performing the following operation to update the merged tracklet;

removing, from the image block sequence, other image blocks than an image block with a highest detection score among the plurality of image blocks.

14. A device for improving multi-object tracking, characterized by comprising:

a memory, having instructions stored thereon; and at least one processor coupled to the memory and configured to execute the instructions to perform a split operation on each of a plurality of tracklets, for corresponding objects respectively, provided by a multi-object tracking model;

wherein the split operation comprises:

determining an appearance feature sequence corresponding to an image block sequence of the tracklet;

determining a clustering label set by clustering a plurality of appearance features in the appearance feature sequence;

determining, based on the clustering label set, an image block label sequence composed of clustering labels of appearance features of image blocks in the image block sequence;

determining a fragment label sequence corresponding to continuous fragments, having the same clustering labels, in the image block label sequence, wherein each of fragment labels in the fragment label sequence is the same clustering label of a corresponding continuous fragment;

in a case where a length of the fragment label sequence is greater than the number of types of the clustering labels in the clustering label set, updating the image block label sequence and the fragment label sequence by performing an update operation; and splitting the tracklet based on the updated image block label sequence;

wherein the update operation comprises:

updating the fragment label sequence based on a current continuous fragment corresponding to a current fragment label in the fragment label sequence, a previous continuous fragment corresponding to a previous fragment label previous to the current fragment label, and a next continuous fragment corresponding to a next fragment label following the current fragment label; and updating the image block label sequence based on the updated fragment label sequence.

15. The device according to claim 14, wherein the update operation comprises:

in a case where the previous fragment label is same as the next fragment label, if a length of the current continuous fragment is less than or equal to a first length threshold, updating the current fragment label to the previous fragment label, and updating all clustering labels in the current continuous fragment to the previous fragment label; and otherwise, updating the previous fragment label to a new clustering label, updating all clustering labels in the previous continuous fragment to the new clustering label, and updating the clustering label set by adding the new clustering label into the clustering label set.

16. The device according to claim 15, wherein the update operation comprises:

in a case where the previous fragment label is different from the next fragment label, keeping image block labels of the previous continuous fragment, the current continuous fragment, and the next continuous fragment unchanged.

17. The device according to claim 15, wherein the update operation comprises:

in a case of selecting each of fragment labels from a second fragment label to a second to last fragment label in the fragment label sequence as the current fragment label respectively, determining whether to update the fragment label sequence.

18. The device according to claim 17, wherein the update operation comprises:

after the current fragment label traverses each of the fragment labels from the second fragment label to the second to last fragment label in the fragment label sequence, in a case where it is determined that no fragment label update operation occurs during the traversing operation, replacing a fragment label, in the fragment label sequence, that appears for a second time relative to a previous fragment label sequence with a new fragment label.

19. The device according to claim 14, wherein the at least one processor is further configured to execute the instructions to: perform a merge operation on a plurality of updated tracklets obtained by performing the splitting operation on the plurality of tracklets;

wherein the merge operation comprises:

determining a first cosine distance matrix of the plurality of updated tracklets based on a first type of appearance features of respective updated tracklets associated with image block detection scores;

determining a second cosine distance matrix of the plurality of updated tracklets based on a second type of appearance features of respective updated tracklets associated with most similar image block pairs between tracklets;

determining a Hadamard product of the first cosine distance matrix and the second cosine distance matrix as a third cosine distance matrix;

based on information of an image block pair for an element in the third cosine distance matrix, adjusting the element;

performing hierarchical clustering on the plurality of updated tracklets based on the adjusted third cosine distance matrix; and based on a clustering result of the hierarchical clustering, merging a plurality of updated tracklets belonging to the same hierarchical clustering classification.

20. A computer-readable non-transitory storage medium storing a program thereon, characterized in that the program, when executed by a computer, causes the computer to perform a split operation on each of a plurality of tracklets, for corresponding objects respectively, provided by a multi-object tracking model;

wherein the split operation comprises:

determining an appearance feature sequence corresponding to an image block sequence of the tracklet;

determining a clustering label set by clustering a plurality of appearance features in the appearance feature sequence;

determining, based on the clustering label set, an image block label sequence composed of clustering labels of appearance features of image blocks in the image block sequence;

determining a fragment label sequence corresponding to continuous fragments, having the same clustering labels, in the image block label sequence, wherein each of fragment labels in the fragment label sequence is the same clustering label of a corresponding continuous fragment;

in a case where a length of the fragment label sequence is greater than the number of types of the clustering labels in the clustering label set, updating the image block label sequence and the fragment label sequence by performing an update operation; and splitting the tracklet based on the updated image block label sequence;

wherein the update operation comprises:

updating the fragment label sequence based on a current continuous fragment corresponding to a current fragment label in the fragment label sequence, a previous continuous fragment corresponding to a previous fragment label previous to the current fragment label, and a next continuous fragment corresponding to a next fragment label following the current fragment label; and updating the image block label sequence based on the updated fragment label sequence.

* * * * *